United States Patent Office 3,845,161
Patented Oct. 29, 1974

3,845,161
CURABLE COMPOSITIONS
Melvin D. Beers, Ballston Lake, N.Y., assignor to
General Electric Company
No Drawing. Continuation-in-part of application Ser. No. 267,192, June 28, 1972, which is a continuation-in-part of application Ser. No. 153,812, June 16, 1971, both now abandoned. This application Sept. 26, 1973, Ser. No. 400,895
Int. Cl. C08g 47/02
U.S. Cl. 260—825
10 Claims

ABSTRACT OF THE DISCLOSURE

Fluid organopolysiloxanes which are vulcanizable at room temperature to silicone elastomers are prepared by mixing a titanium chelate catalyst, a cross-linking agent such as methyltrimethoxysilane, a silanol chain-stopped polydiorganosiloxane fluid having a viscosity of from about 1,000 to about 10,000,000 centipoise at 25° C., and a low molecular weight silanol-stopped polydiorganosiloxy fluid which acts as a viscosity depressing additive in the absence of moisture. These compositions are stable, free-flowing fluids in the absence of moisture but cure to the rubbery solid, elastic state upon exposure to moisture. The compositions are particularly useful as adhesives and sealants in the construction of electronic equipment in that they do not give off corrosive by-products when curing. They are also useful in the formation of orthopedic devices cast on the human foot.

BACKGROUND OF THE INVENTION

This application is a continuation-in-part of parent application Ser. No. 267,192, filed June 28, 1972, which is a continuation-in-part of parent application Ser. No. 153,812, filed June 16, 1971 of Melvin D. Beers, both now abandoned.

This invention pertains to a viscosity depressing additive for fluid organopolysiloxanes which are capable of vulcanizing at room temperature to rubbery materials.

The prior art room temperature vulcanizing materials (RTV's) comprise a linear polymer and a cross-linking agent. The prior art alkoxy type of non-corrosive RTV's which have had commercial success have suffered the disadvantage of extreme thickening during the initial mixing of the ingredients due to the presence of the titanium chelate catalyst followed by a viscosity decrease only upon prolonged standing. A disadvantage of the RTV's which thicken immediately upon mixing the ingredients is that it is difficult to handle the material in its thickened state, thus making the mixing, transferring and packaging steps burdensome.

SUMMARY OF THE INVENTION

The RTV's of the present invention comprise a base silanol chain-stopped polydiorganosiloxane having a viscosity of preferably from about 1,000 to 90,000 centistokes and generally of 1,000 to 10,000,000 centistokes at 25° C., at least one silane represented by the formula:

(1) $\qquad R_mSi(OR^1)_{4-m}$ and a titanium chelate catalyst, preferably a titanium chelate catalyst of the formula:

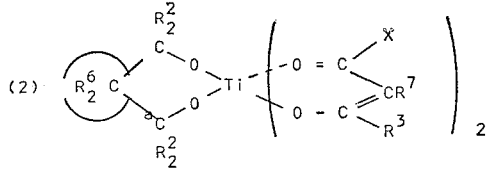

and a viscosity depressant of the formula:

(3) 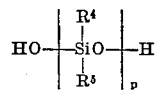

where R is a radical having not more than about 8 carbon atoms selected from the group consisting of hydrocarbyl, halohydrocarbyl, and cyano lower alkyl where the hydrocarbyl radicals may have carboxy moieties therein, $R^1$ is a radical not having not more than about 8 carbon atoms selected from the group consisting of hydrocarbyl, halohydrocarbyl and cyano lower alkyl, $R^2$ is a radical selected from the group consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^4$ and $R^5$ are each organic radicals of not more than 8 carbon atoms selected from the group consisting of hydrocarbyl, halohydrocarbyl and cyano lower alkyl, $p$ varies from 2 to 46, generally, and preferably varies from 3 to 9, $R^6$ can be selected from the same group as $R^2$ and, in addition, can be halo, cyano, nitro, carboxy ester, acyl and hydrocarbyl substituted by halo, cyano, nitro, carboxy ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ can form together with the carbon atoms to which they are attached cyclic hydrocarbon substituents of not more than about 12 carbon atoms and chloro, nitro, acyl, cyano and carboxy ester substituted cyclic hydrocarbon substituents; X is a radical selected from the class consisting of radicals having up to about 20 carbon atoms selected from the group consisting of hydrocarbyl, halohydrocarbyl, cyanoalkyl, alkoxy, haloalkoxy, cyanoalkoxy and amino, $a$ has a value of 0 to 8 and such that when $a$ is zero the

moieties are bonded to each other in a cyclic fashion, $m$ has a value of 0 to 3 and an average value based upon the total amount of silane in the composition of 0 to 1.99.

The term hydrocarbyl as used here means the hydrocarbon from which one hydrogen atom has been removed, i.e., a monovalent hydrocarbon radical.

The abbreviation of RTV as used herein means a room temperature vulcanizable material.

In the construction and fabrication of electronic components the mixing immediately prior to using requirements, the corrosion problems and the thickening and thinning with time problems associated with the prior art RTV's no longer exist. The RTV's of the present invention do not require mixing immediately prior to use, are stable indefinitely, do not thicken appreciably upon mixing the ingredients, and do not result in corrosion when used in electronic circuits. They are also useful in the fabrication of orthopedic devices which can be cast and cured on the human foot or other body member.

DESCRIPTION OF THE PREFERRED EMBODIMENTS

In the formula of the cross-linking agent used in the practice of the present invention (1)

R and $R^1$ can be, for example, mononuclear aryl, such as phenyl, benzyl, tolyl, xylyl and ethylphenyl; halogen-substituted mononuclear aryl, such as 2,6-di-chlorophenyl, 4 - bromophenyl, 2,5-di-fluorophenyl, 2,4,6 - trichlorophenyl and 2,5 - dibromophenyl; alkyl such as methyl, ethyl, n-propyl, isopropyl, n-butyl, sec-butyl, isobutyl, tert-butyl, amyl, hexyl, heptyl, octyl; alkenyl such as vinyl, allyl, n-butenyl-1, n-butenyl-2, n-pentenyl-2, n-hexenyl-2, 2,3 - dimethylbutenyl - 2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, di-iodoethyl, tribromomethyl, trifluoromethyl, dichloroethyl, chloro-n-propyl, bromo-n-propyl, iodoisopropyl, bromo - n - butyl, bromo-tertbutyl, 1,3,3-trichlorobutyl, 1,3,3 - tribromobutyl, chloropentyl, bromopentyl, 2,3-dichloropentyl, 3,3 - dibromopentyl, chlorohexyl, bromohexyl, 1,4 - dichlorohexyl, 1,3 - dibromohexyl, bromooctyl; haloalkenyl such as chlorovinyl, bromovinyl, chloroallyl, bromoallyl, 3 - chloro - n - butenyl - 1, 3-chloro-n-pentenyl - 1, 3 - fluoro - n - heptenyl-1, 1,3,3-trichloro - n - heptenyl - 5, 1,3,5-trichloro-n-octenyl-6, 2,3,3 - trichloromethylpentenyl - 4; haloalkynyl such as chloropropargyl, bromopropargyl; cycloalkyl, cycloakenyl, and halogen-substituted cycloalkyl and cycoalkenyl such as cyclopentyl, cyclohexyl, cyclohepteyl, cyclooctyl, 6-methylcyclohexyl, 3,4 - dichlorocyclohexyl, 2,6-dibromocycloheptyl, 1 - cyclopentenyl, 3 - methyl - 1 - cyclopentenyl, 3,4 - dimethyl - 1 - cyclopentenyl, 5-methyl-5-cyclopentenyl, 3,4 - dichloro - 5 - cyclopentenyl, 5-(tert-butyl) - 1 - cyclopentenyl, 1-cyclohexenyl, 3-methyl-1-cyclohexenyl, 3,4 - dimethyl - 1 - cyclohexenyl; and cyano lower alkyl such as cyanomethyl, beta-cyanoethyl, gamma - cyanopropyl, delta - cyanobutyl, and gamma-cyanoisobutyl.

In the formula of the preferred catalyst used in the practice of the present invention

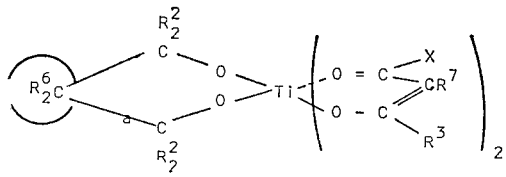

$R^2$ can be hydrocarbyl and halohydrocarbyl such as those listed above for R or hydrogen. In addition, $R^2$ can be a carboxy alkyl of the formula $R^8CO_2$— where $R^8$ is selected from the same group as R and can be joined to the $CO_2$ group either through the carbonyl carbon or an oxygen atom of the carboxyl group, $R^3$ can be hydrocarbyl, halohydrocarbyl and cyanoalkyl such as those listed above for R, $R^6$ is a radical having not more than about 8 carbon atoms and can be selected from the same group as $R^2$ and, in addition, can be halo, cyano, nitro, carboxy ester, acyl and substituted hydrocarbyl containing halo, cyano, nitro, carboxy ester and acyl, the substituted hydrocarbyl can be derived from those listed above for R and the hydrocarbyl portion of the carboxy ester and the acyl can also be selected from the hydrocarbyl listed above for R, $R^7$ is selected from the group consisting of hydrogen, hydrocarbyl having not more than about 8 carbon atoms selected from the group set forth in the definition of R, halohydrocarbyl having not more than about 8 carbon atoms selected from the group set forth in the definition of R, acyl having not more than about 8 carbon atoms, the hydrocarbyl portion of which is selected from the group set forth in the definition of R. In addition, $R^7$, when taken together with $R^3$, can form together with the carbon atoms to which they are attached cyclohydrocarbon substituents of not more than about 12 carbon atoms and chloro, nitro, acyl, cyano and carboxy ester substituted cyclohydrocarbon substituents, the hydrocarbyl portion of the carboxy ester and acyl can be selected from the hydrocarbyl listed above for R, X can be hydrocarbyl, halohydrocarbyl and cyanoalkyl such as those listed above for R. In addition, X can be a radical having up to 20 carbon atoms selected from the group consisting of alkoxy, haloalkoxy, and cyanoalkoxy and amine. The groups represented by X can be methoxy, ethoxy, butoxy, propoxy, pentoxy, heptoxy; haloalkoxy such as chloromethoxy, iodomethoxy, bromomethoxy, fluoromethoxy, chloromethoxy, iodoethoxy, bromoethoxy, fluoroethoxy, trichloromethoxy, diiodoethoxy, dibromomethoxy, trifluromethoxy, dichloroethoxy, chloro - n - propoxy, bromo-n-propoxy, iodoisopropoxy, bromo - n - butoxy, bromo-tert-butoxy, 1,3,3-trichlorobutoxy, 1,3,3 - tribromobutoxy, chloropentoxy, bromopentoxy, 2,3 - dichloropentoxy, 3,3 - dibromopentoxy, chlorohexoxy, bromohexoxy, 2,4 - dichlorohexoxy, 1,3 - dibromohexoxy, 1,3,4 - trichlorohexoxy, chlorohexoxy, chloroheptoxy, bromoheptoxy, fluoroheptoxy, 1,3 - dichloroheptoxy, 1,4,4 - trichloroheptoxy, 2,4-dichloromethylheptoxy, chlorooctoxy, bromooctoxy, iodooctoxy, 2,4 - dichloromethylhexoxy, 2,4 - dichlorooctoxy, 2,4,4 - trichloromethylpentoxy, 1,3,5 - tribromooctoxy; the cyanoalkoxy can be cyanomethoxy, beta-cyanoethoxy, gamma-cyanopropoxy, delta - cyanobutoxy, gamma - cyanoisobutoxy, beta - cyanopropoxy and alpha-cyanobutoxy; the hydrocarbyl portions of the amino can be selected from the group defined by R and the amino can be, for example, diethylamino, methylamino, diisopropylamino, octylamino, and ethylbutylamino. Although in many applications of the first room temperature vulcanizable silicone rubber compositions of the present case, in the chelate catalyst used therein X may have up to 8 carbon atoms, in some applications of the first room temperature vulcanizable silicone rubber compositions especially in the insulation of electrical components where essentially no corrosive by-products are desired in the cure of the compositions it is preferred that in the chelate catalyst X have up to 2 to 20 carbon atoms such as 15 or 20 carbon atoms.

The viscosity depressants of formula (3) are well known compositions and include compositions containing different $R^4$ and $R^5$ groups. For example, the $R^4$ groups can be methyl, while the $R^5$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably at least 50% of the $R^4$ and $R^5$ groups of the silanol chain-stopped polydiorganosiloxanes are methyl groups. The viscosity depressant of formula (3) has a viscosity that generally varies from 10 to 100 centistokes at 25° C. when p varies from 2 to 46 and, more preferably, from 15 to 50 centistokes at 25° C. where p varies from 3 to 9. Preferably, the value of p varies from 3 to 9 in formula (3) but generally p may vary from 2 to 46. Generally, when p varies from 2 to 46, the viscosity depressant functions effectively throughout the entire range of the other ingredients, since it will have a viscosity that varies from 10 to 100 centistokes at 25° C. Above this viscosity range the viscosity depressant does not lower the viscosity of the composition sufficiently below the above viscosity range. Below this range, the viscosity depressant is a silane which is unstable and too reactive to function as a viscosity depressant in the composition. The viscosity depressant is most effective when p preferably varies from 3 to 9 and its viscosity correspondingly varies from 15 to 50 centistokes at 25° C. It is quite important that for the viscosity depressant to function as desired that generally it should have 1% to 20% by weight of hydroxyl content based on the weight of the viscosity depressant fluid and preferably 5 to 15% by weight. Generally, for the viscosity depressant to be effective it must be used at a concentration of 0.3 to 20 parts based on 100 parts of the basic silanol diorganopolysiloxane and preferably at a concentration of 1 to 5 parts.

In formula (3), the hydrocarbyl, halohydrocarbyl and cyano lower alkyl radicals represented by $R^4$ and $R^5$ can be selected from the same group as those listed above for $R$ and $R^1$.

The base silanol chain-stopped materials useful in the practice of the present invention described as preferably having a viscosity of from about 1,000 to 90,000 centistokes and generally having a viscosity of 1,000 to 10,000,-000 centistokes at 25° C., are well known in the silicone RTV art and have the formula, (4) 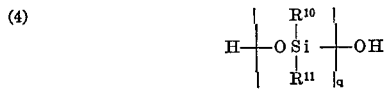

where $R^{10}$ and $R^{11}$ are independently selected from the class of hydrocarbyl radicals, halohydrocarbyl radicals and cyano lower alkyl radicals and preferably of such radicals of up to 8 carbon atoms. The $R^{10}$ and $R^{11}$ radicals are defined and are selected from the same radicals as the $R^4$ and $R^5$ radicals. In addition, $q$ is a whole number that gradually varies from 300 to 5,260 and preferably from 370 to 1,350. Base silanol-stopped gums having a viscosity of 10,000,000 centistokes can be used. Such materials can also contain minor amounts, e.g., up to about 20% of monoorganosiloxane units such as monoalkylsiloxane units, e.g., monomethylsiloxane units and monophenylsiloxane units. The technology involved in incorporating monoalkylsiloxane units into RTV compositions is disclosed in U.S. Pat. 3,382,205 of Beers (1968), which is hereby incorporated into the present application by reference. The silanol chain-stopped materials may also contain triorganosiloxane units, such as trialkylsiloxane units, e.g., trimethylsiloxane units, tributylsiloxane units and triphenylsiloxane units. The silanol chain-stopped materials may also contain t-alkoxysilane units, e.g., t-butoxysiloxane units, t-pentoxysiloxane units and t-amyloxysiloxane units. Effective results can be obtained if sufficient t-alkoxysiloxane is utilized in combination with the silanol-terminated polydiorganosiloxane to provide a polymer having a ratio of t-alkoxysiloxane units to silanol of 0.05 to 0.9 and preferably 0.2 to 0.8 tert-alkoxydialkylsiloxy units per silanol. Many of the t-alkoxysiloxanes useful as part of the silanol chain-stopped materials are described and claimed in U.S. Pat. 3,438,930 of Beers which issued Apr. 15, 1969 and is assigned to the General Electric Company, the disclosure of which is expressly incorporated herein by reference.

Examples of silanes useful in the RTV compositions of this invention as cross-linking agents include the following:

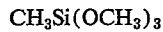

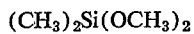

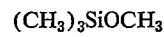

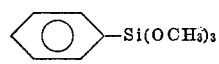

$Si(OCH_3)_4$

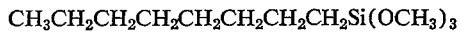

$CF_3CH_2Si(OCH_3)_3$ $NCCH_2CH_2Si(OCH_3)_3$

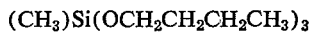

Examples of preferable titanium chelate catalysts of formula (2) useful in the RTV compositions of this invention include the following:

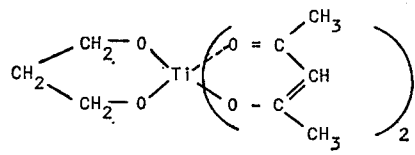

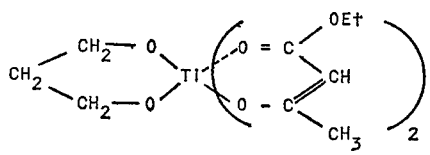

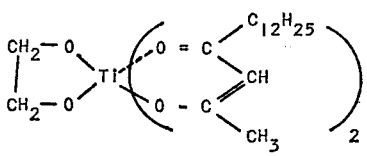

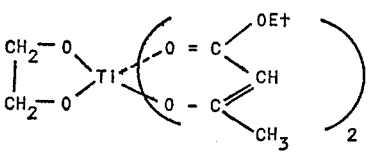

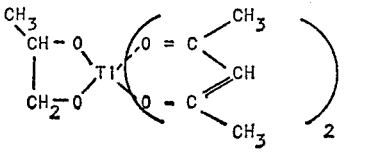

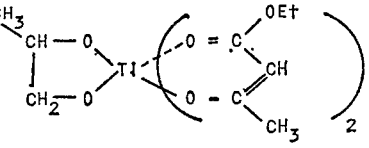

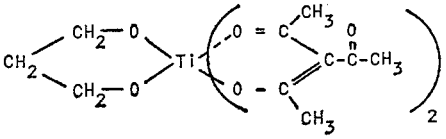

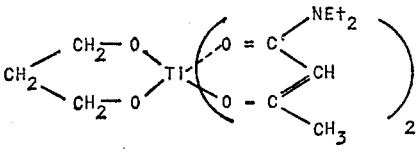

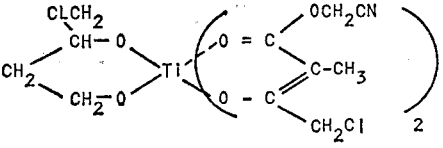

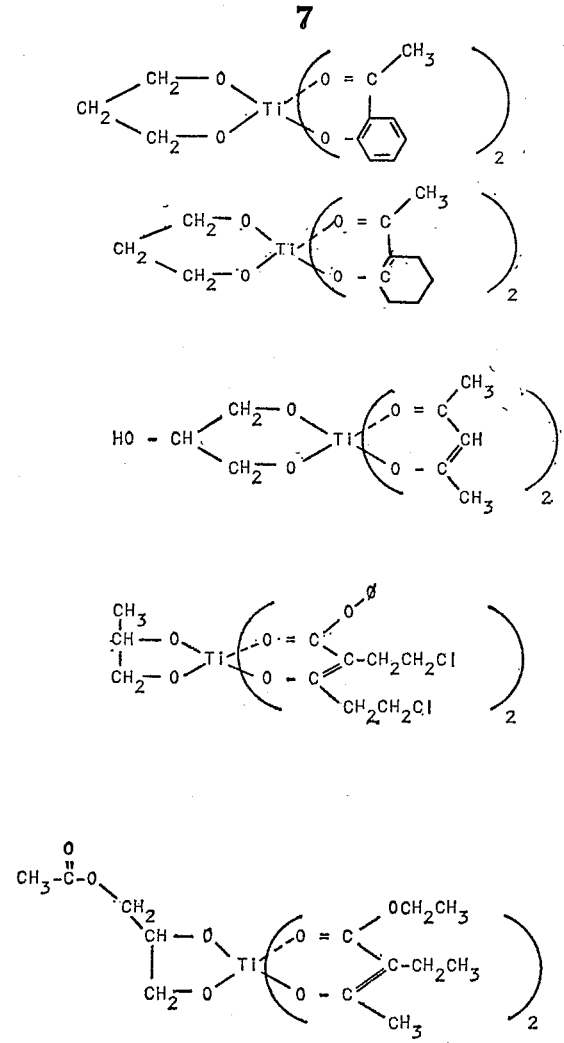

Other examples are readily apparent from the description of the substituents which may be present on the titanium.

The titanium chelate catalysts are generally utilized at a concentration of 0.01 to 10 parts based on 100 parts of the based silanol-stopped polymer of formula (4) and preferably at a concentration of 0.5 to 1 part. Although the preferred titanium chelate catalysts in the present invention are the ones within the scope of formula (2), nevertheless, other types of titanium chelate catalysts can be used in the alkoxy type of RTV of the present case. In all cases such titanium catalysts cause undesirable viscosity increases which are assuaged by the viscosity depressant of formula (3) as set forth in the composition of the present case.

The preferred alkanedioxy titanium chelates of the present invention can be prepared first by adding a beta-dicarbonyl compound such as a beta-diketone or a beta-keto-ester to a titanium ortho ester of a lower aliphatic alcohol. This reaction is represented by the following equation:

$$R^9O-\underset{\underset{R^9}{\overset{\overset{R^9}{O}}{|}}}{Ti}-OR^9 + 2\ R^3-\overset{O}{\overset{\|}{C}}-\underset{\underset{H}{|}}{\overset{\overset{R^7}{|}}{C}}-\overset{O}{\overset{\|}{C}}-X \longrightarrow$$

$$\underset{R^9O}{\overset{R^9O}{\diagdown}}Ti\underset{}{\Biggl(}\underset{O-C\diagdown_{R^3}}{\overset{O=C\diagup^X}{\diagdown_{CR^7}\diagup}}\Biggr)_2 + 2\ R^9OH$$

Preferably, two moles of the beta-dicarbonyl compound are used per mole of titanium compound. Toluene is the preferred solvent, preferably, in the amount of from .5 parts to 10 parts per part of alkyl titanate. In the above formula, $R^9$ is a lower alkyl radical having 1 to 8 carbon atoms and $R^3$, $R^7$ and X are as previously defined. It is preferred that stoichiometric quantities of reactants be employed as this avoids the problem of removing unreactive starting material.

The second step of the preparation involves the reaction of the dialkoxy titanium chelate preparation of which is described above with an alkanediol. This reaction is illustrated by the following equation:

$$HO-\overset{\overset{R^2}{R^2_2}}{\underset{}{C}}-\Biggl[\overset{\overset{R^6}{R^6_2}}{\underset{}{C}}\Biggr]_a-\overset{\overset{R^2}{R^2_2}}{\underset{}{C}}-OH + \underset{R^9O}{\overset{R^9O}{\diagdown}}Ti\Biggl(\overset{O=C\diagup^X}{\underset{O-C\diagdown_{R^3}}{\diagdown CR^7\diagup}}\Biggr)_2 \longrightarrow$$

$$\Biggl(\overset{C-O}{\underset{C-O}{\diagup}}\Biggr)\underset{a}{\overset{R^6_2 C}{}}Ti\Biggl(\overset{O=C\diagup^X}{\underset{O-C\diagdown_{R^3}}{\diagdown CR^7\diagup}}\Biggr)_2 + 2\ R^9OH$$

In the above formulas, $R^2$ and $R^6$ are as previously defined. Again, it is preferred that the quantities of reactants be stoichiometric. If an excess of the alkanediol is employed only one of the hydroxyl groups of some of the diol will react with the titanium by alkoxy interchange to form hydroxyalkoxy-substituted titanates. In addition to the desired product, the alkoxy exchange reaction employing the diol also can lead to the formation of minor amounts of polymeric materials where one hydroxy of the diol will react with one titanium chelate and the second hydroxy will react with the second titanium chelate to form a dimer. Trimer and tetramer formation can also occur in this manner. The use of large quantities of solvent such as from two to twenty parts of toluene per part of the chemlated dialkyl titanates tends to diminish trimer and tetramer formation.

It is preferred that when the dicarbonyl compound is a lower alkyl ester of acetoacetic acid that the temperature be maintained below 70° C. The preferred dicarbonyl compound is a lower alkyl ester of acetoacetic acid. The alkyl group can be straight chain or branched. The preferred group of acetoacetates include methylacetoacetate, ethylacetoacetate, propylacetoacetate, isobutylacetoacetate, pentylacetoacetate, hexylacetoacetate, heptylacetoacetate, and octylacetoacetate. The preferred acetoacetate is ethylacetoacetate. It is also preferred that $R^9$ be an isopropyl radical as this via alkoxy interchange produces isopropyl alcohol. The isopropyl alcohol can then be azeotroped off using toluene as the azeotroping agent in both of the above-described reactions.

The use of a solvent is not necessary but is preferred. Solvents other than toluene which can be employed include benzene, xylene, hexane or any other of the well known solvents useful for the azeotropic removal of formed alcohol from solution.

The RTV compositions of the present invention are prepared by simply admixing one or more of the silanes of formula (1), having an average of at least about 2.01 silicon-bonded alkoxy radical per silicon atom, the titanium chelate of formula (2), and the viscosity, depressant of formula (3) with the base silanol chain stopped polydiorganosiloxane of formula (4). The components are preferably at room temperature during mixing. Since the silanes tend to hydroxlyze upon contact with moisture, care should be exercised to exclude moisture during the addition of the silane to the silanol chain-stopped polydiorganosiloxane. Likewise, care should be taken that the mixture is maintained under substantially anhydrous conditions if it is desired to store the mixture for an extended period of time prior to conversion of the composition to the cured state. On the other hand, if it is desired to permit the mixture to cure immediately upon admixture, no special precautions are necessary and the components can be mixed and placed in the form or shape in which it is desired for the composition to be cured.

The amount of the silane of formula (I) admixed with the base silanol chain-stopped polydiorganosiloxane can vary within wide limits. However, for best results, it is preferred to add an excess of one mole of the silane per mole of silanol groups in the base silanol chain-stopped polydiorganosiloxanes of formula (4). Satisfactory curing can be obtained, for example, with from 1.0 to 10 moles of the silane per mole of silanol groups in the polydiorganosiloxane. No particular detriment is suffered from using more than 10 moles of the silane per mole of the base polydiorganosiloxane except for a more resinous product being formed and slowing down the cure. Sufficient viscosity depressant of formula (3) is added to provide from about one mole of OH contributed by the viscosity depressant per mole of titanate to a molar ratio of one mole of OH per 10 moles of titanate. The preferred range is a ratio of about 1:2 to 1:4. The temperature at which the composition is admixed is not critical and a room temperature addition is usually employed.

The admixture can be carried out in the presence of an inert solvent (that is, a solvent which will not react with the silanol or alkoxy groups on the silicon). Suitable solvents include hydrocarbon such as benzene, toluene, xylene, or petroleum ethers; halogenated solvents such as perchloroethylene or chlorobenzene and organic ethers such as diethylether and dibutylether; ketones such as methylisobutylketone and fluid hydroxyl-free polysiloxanes. The presence of a solvent is particularly advantageous when the sillanol chain-stopped polydiorganosiloxane is a high molecular weight gum. The solvent reduces the overall viscosity of the composition and facilitates cure. The RTV compositions may be kept in the solvent until they are to be used. This is particularly valuable when a gummy composition is to be employed in coating applications.

The RTV compositions of this invention are stable in the absence of moisture. Consequently, they can be stored for prolonged periods of time without deleterious effect. During this period of storage no significant change occurs in the physical properties of the RTV compositions. This is of particular importance from a commercial standpoint, since it assures that once an RTV composition is prepared with a certain consistency and cure time that neither will change significantly upon storage. Storage stability is one of the characteristics which makes the compositions of this invention particularly valuable as one component room temperature vulcanizing compositions.

A wide choice of components is available in the preparation of the RTV compositions of the present invention. In general, the particular components employed are a function of the properties desired in the cured silicone rubber. Thus, with a particular silane, some variation in the properties of the cured silicone rubber are obtained by varying the molecular weight (as measured by viscosity) of the silanol chain-stopped polydiorganosiloxane. For a given system, as the viscosity of the silanol chain-stopped starting material increases, the elongation of the cured rubber increases. On the other hand, with a lower viscosity material, the cure is tighter so that the cured rubber has a lower elongation and increased hardness.

RTV compositions prepared by mixing the novel viscosity depressant, a titanium catalyst and the silane with the base silanol chain-stopped polydiorganosiloxanes can be used without further modification in many sealing, caulking or coating applications by merely placing the compositions in the desired place and permitting them to cure upon exposure to the moisture present in the atmosphere. Upon exposure of such compositions to atmospheric moisture, even after storage for times as long as two years or more, a "skin" will form on the compositions shortly after exposure and cure to the rubbery state will occur within one to three days, all at room temperature. The time required for the formation of such skin can vary from a minimum of about one hour to a maximum of about eight hours.

It is often desirable to modiy the RTV compositions of the present invention by the addition of various materials which act as extenders or which change various properties such as cure rate and color. For example, if it is desired to reduce the time required for complete cure, the composition can be modified by the incorporation of a minor amount of carboxylic acid salt, alkoxide, hydroxide, and/or oxide of a metal ranging from lead to manganese, inclusive, in the electromotive series of metals. The particular metals included are lead, tin, nickel, cobalt, iron, cadmium, chromium, zinc and manganese with tin being preferred. The carboxylic acids from which the salts of these metals are derived can be monocarboxylic acids or dicarboxylic acids and the metallic salts can be either soluble or insoluble in the silanol chain-stopped polydiorganosiloxane. Preferably, the salts employed are soluble in the silanol chain-stopped polydiorganosiloxane since this facilitates the uniform dispersion of the salt in the reaction mixture.

Illustrative of metal salts which can be employed are, for example, zinc naphthenate, lead naphthenate, cobalt naphthenate, iron 2-ethylhexoate, cobalt octoate, zinc octoate, lead octoate, chromium octoate, and tin octoate. Operative metals salts include those in which the metallic ion contains a hydrocarbon substituent such as, for example, carbomethoxyphenyl tin tris-uberate, isobutyl tin triceroate, cyclohexenyl lead triactotinate, dimethyl tin dibutyrate, basic dimethyl tin oleate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, diphenyl lead diformate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tri-stearyl lead succinate, tri-naphthyl lead p-methylbenzoate, tris-phenyl lead cyclohexenyl acetate, triphenyl lead ethylmalonate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5% by weight of such metal salt based on the weight of the silanol chain-stopped polydiorganosiloxane. Preferably, where such metal salt is employed, it is present in an amount equal to from about 0.01% to 2.0% by weight, based on the weight of the polydiorganosiloxane.

Metal chelates such as those disclosed in U.S. Pats. 3,334,067 and 3,065,194 can also be used in the RTV compositions of this invention in amounts from about 0.01 part to about 10 parts based on 100 parts of the base silanol chain-stopped polydiorganosiloxane of formula (4), although the titanium chelate catalysts of formula (2) are preferred.

The alkoxides second catalyst or co-catalyst which can be used in the practice of the present invention include dibutyl tin dimethoxide, dimethyl tin diethoxde, dibutyl tin dibutoxide, tin tetraisopropoxide, tin tetramethoxide, and tributyl tin methoxide.

The RTV compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, silazane treated silica, precipitated silica, octamethylcyclotetrasiloxane treated silica, glass fibers, magnesium oxide, chromic oxide, zirconium oxide, aluminum oxide, crushed quartz, calcined clay, asbestos, carbon, graphite, cork, cotton, synthetic fibers, etc. Silazane treated silica fillers such as those disclosed and claimed in application Ser. No. 789,352 of Smith, filed Jan. 6, 1969, now U.S. Pat. 3,635,743, are particularly suitable for use in the RTV compositions of the present invention, they are generally employed in amounts from about 5 to about 200 parts filler, per 100 parts of the base silanol chain-stopped polydiorganosiloxane.

In addition to the modification of the RTV compositions of the present invention by addition of metal salt, cure accelerators and fillers, these compositions can also be modified by the incorporation of various flame retardants, stabilizing agents and plasticizers such as siloxane fluids. Suitable flame retardants include antimony oxide, various polyhalogenated hydrocarbons and organic sulfonates.

Where the compositions of the present invention contain components other than the silane, the titanium chelate catalyst, the viscosity depressing additive and the base polydiorganosiloxane, the various ingredients can be added in any desired order. However, for ease of manufacturing, it is often convenient to form a blend or mixture of all of the components of the room temperature vulcanizing organopolysiloxane except the silane of formula (1) and the titanium chelate catalyst, to then remove moisture from the resulting mixture by maintaining the mixture under vacuum and thereafter to add the silane and the titanium chelate catalyst prior to packaging of the composition in containers protected from moisture.

The RTV compositions of the present invention are particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The silanes represented by formula (1) are well known in the art and are described, for example, in U.S. Pat. 2,843,555 of Berridge.

When the silane is employed as a cross-linking agent, $m$ has a value of 1 and the preferred silane is

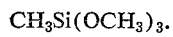

$$CH_3Si(OCH_3)_3.$$

When it is desired to have a chain extending agent employed in combination with the cross-linking agent, $m$ has a value of 2, resulting in the silane being difunctional. The preferred difunctional silane is $(CH_3)_2Si(OCH_3)_2$. The presence of a chain extending agent results in a final cured product having a higher degree of elasticity. The same result would be obtained if a higher molecular weight silanol-stopped fluid were used, However, the use of such a higher molecular weight silanol-stopped fluid would result in a much higher viscosity of the curable composition resulting in difficulties in handling the extremely viscous material.

When it is desired to improve the modulus of elasticity, a silane of formula (1), wherein $m$ has a value of 3, is incorporated into the RTV composition. The preferred silane for this application is $(CH_3)_3SiOCH_3$. The use of this monofunctional silane chain terminating unit in combination with the cross-linking and optionally chain extending silanes discussed above, not only results in a higher modulus of elasticity but in many instances also improves the adhesion of the cured compositions to a substrate.

The preferred base silanol chain-stopped polydiorganosiloxanes of formula (2) to be used in combination with the silane cross-linking agent described above are silanol chain-stopped polydiorganosiloxanes having a viscosity in the range of preferably about 1,000 centistokes to 90,000 centistokes at 25° C. The preferred base polydiorganosiloxanes are polydimethylsiloxanes and can contain some trimethylsiloxy groups. The presence of tertiary alkoxy groups such as t-butoxy groups also improves the adhesion of the RTV's of the present invention to particular substrates.

Generally speaking, in the preferred embodiment of the present invention, R is an alkyl radical of not more than 4 carbon atoms, $R^1$ is an alkyl radical of not more than 4 carbon atoms, $R^2$ is hydrogen, $R^3$ is an alkyl radical of not more than 4 carbon atoms and at least 50% of the groups represented by $R^4$ and $R^5$ are methyl radicals, the remainder phenyl.

The preferred silanes of formula (1) used in the RTV compositions described in the present invention contain on the average of from 2.05 to 3 silicon-bonded alkoxy groups per silane when a fluid containing two silanol terminal groups is employed. If the number of alkoxy groups were to be two this would merely result in a build-up of chain length. Average in this situation means the total number of silicon bonded alkoxy groups divided by the total number of silane molecules used in the RTV composition. The number, of course, can drop below two when the silanol-stopped polydiorganosiloxane contains more than two silanol groups per molecule. This occurs when there is chain branching in the polydiorganosiloxane and no chain stopping with nonreactive groups such as t-butoxy groups, alkyl groups or trimethylsilyl groups.

As stated previously, the preferred RTV compositions of the present invention can include a second catalyst such as a tin catalyst, i.e., dibutyl tin dimethoxide. The preferred second catalyst of the titanium chelate catalysts of the present invention include dialkyl tin dialkoxide such as dibutyl tin dimethoxide, dimethyl tin diethoxide, dimethyl tin dimethoxide and other preferred components include hydroxy alkyl tin salts such as hydroxy dimethyl tin oleate and dihydroxymethyl tin oleate. Solubilized dibutyl tin oxide is also a very effective second catalyst. This material is available from Argus Chemical Corp., 633 Court Street, Brooklyn, N.Y. 11231.

As stated previously, the preferred RTV compositions of the present invention also include fillers. The most preferred of which is the silazane treated silica filler disclosed and claimed in application Ser. No. 789,352 of Smith, filed Jan. 6, 1969, now U.S. Pat. 3,635,743. The fillers are preferably used in amounts from about 10 to about 100 parts of filler, per 100 parts of the silanol chain-stopped polydiorganosiloxane.

The silazane treated filler can be prepared by the following procedure. A fumed silica filler is contacted with ammonia for about 1½ hours at 25° C. with agitation. Hexamethyldisilazane is added to the treated filler in an amount of about 20 parts per 100 parts of treated filler and the mixture is heated to about 130° C. for about 2 hours. Water in an amount of about one part by weight is added to the mixture and heating is continued at 130° C. for an additional hour. The treated silica filler is then purged with $N_2$ at 130° C. until the $NH_3$ content is 50 p.p.m.

EXAMPLE 1

A base compound was prepared containing 100 parts of a 3000 centipoise silanol-terminated polydimethylsiloxane fluid corresponding to the formula,

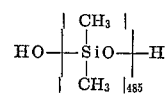

7.0 parts of a fumed silica which had been treated with octamethylcyclotetrasiloxane, the filler had a surface area of 200 square meters per gram, 11.0 parts of hexamethyldisilazane treated fumed silica having a surface area of 200 square meters per gram and 2.5 parts of a low molecular weight silanol-terminated polydimethylsiloxane containing 6.2 weight percent hydroxyl groups.

To 100 parts of this base compound was added 4.3 parts of methyltrimethoxysilane, 0.75 parts of 1,3-propanedioxytitanium bis(ethylacetoacetate), 0.75 parts of 1,3,5-tris-trimethoxysilylpropylisocyanurate as an adhesion promoter, and 0.07 parts of dibutyl tin dimethoxide. A control was prepared containing all of the above ingredients except the low molecular weight silanol- terminated polydimethylsiloxane containing 6.2 weight percent hydroxyl groups. The properties of the new sealant described in this example and the control are shown in the following table:

|  | Control | New sealant |
|---|---|---|
| Shore A hardness | 45 | 45 |
| Tensile, p.s.i. | 390 | 370 |
| Elongation, percent | 230 | 250 |
| Tear, lbs./inch | 18 | 21 |
| Application rate using a ⅛" Simco nozzle at 90 p.s.i. pressure at maximum viscosity | 11.4 | 181 |

EXAMPLE 2

A base compound was prepared by mixing 70 parts of a 30,000 centipoise silanol-terminated polydimethylsiloxane, 30 parts of a 3000 centipoise partially t-butoxy and silanol-terminated polydimethylsiloxane having an OH to t-butoxy ratio of 2.76, 2.7 parts of a silanol-terminated, low molecular weight polydimethylsiloxane having a hydroxyl content of 6.2 weight percent, and 27 parts of hexamethyl-disilazane treated fumed silica having a surface area of 200 square meters per gram.

To 100 parts of this base compound was added 4.3 parts of methyltrimethoxysilane, 0.75 parts of 1,3-propanedioxytitanium bis(ethylacetoacetate), 0.75 parts of 1,3,5-tris-trimethoxysilylpropylisocyanurate as an adhesion promoter, and 0.05 parts of dibutyltindimethoxide. The properties of the new sealant described in this example and the control without the silanol-terminated low molecular weight polydimethylsiloxane having a hydroxyl content of 6.2 weight percent are shown in the following table:

|  | Control | New sealant |
|---|---|---|
| Shore A hardness | 48 | 46 |
| Tensile, p.s.i. | 830 | 815 |
| Elongation, percent | 620 | 670 |
| Tear, lbs./inch | 125 | 150 |
| Application rate (using a ⅛ "Simco nozzle at 90 p.s.i. pressure at maximum viscosity) | 0.72 | 15 |

EXAMPLE 3

The base compound was prepared containing 100 parts of a 3000 centipoise silanol-terminated polydimethylsiloxane fluid corresponding to the formula:

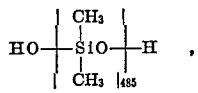

7.0 parts of a fumed silica which had been treated with octamethylcyclotetrasiloxane, the filler had a surface area of 200 square meters per gram, 11.0 parts of hexamethyldisilazane treated fumed silica having a surface area of 200 square meters per gram and 2.5 parts of a low molecular weight silanol-terminated polydimethylsiloxane containing 6.2 weight percent hydroxyl groups.

To 100 parts of this base compound was added 4.3 parts of methyltrimethoxysilane and 0.75 parts of 1,3-propanedioxytitanium bis(ethylacetoacetate). A control was prepared containing all of the above ingredients except the low molecular weight silanol-terminated polydimethylsiloxane containing 6.2 weight percent hydroxyl groups.

The properties of the new sealant described in this example and the control are shown in the following table:

|  | Control | New sealant |
|---|---|---|
| Shore A hardness | 39 | 37 |
| Tensile, p.s.i. | 380 | 350 |
| Elongation, percent | 320 | 340 |
| Tear, lbs./inch | 30 | 35 |
| Application rate (using a ⅛" Simco nozzle at 90 p.s.i. pressure at maximum viscosity) | 20 | 314 |

I claim:

1. A fluid composition stable under substantially anhydrous conditions and curable to an elastic solid in the presence of moisture consisting essentially of a base silanol chain-stopped polydiorganosiloxane having the formula,

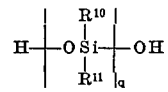

where $R^{10}$ and $R^{11}$ are independently selected from the class consisting of hydrocarbyl, halohydrocarbyl and cyano lower alkyl and $q$ varies from 300 to 5,260, a silane represented by the formula:

$$R_mSi(OR^1)_{4-m}$$

0.01 to 10 parts based on 100 parts of the base polydiorganosiloxane of a titanium chelate catalyst and 0.3 to 20 parts based on 100 parts of the polydiorganosiloxane of a viscosity depressant of the formula:

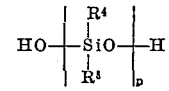

wherein R is a radical having not more than about 8 carbon atoms selected from the group consisting of hydrocarbyl, halohydrocarbyl, and cyano lower alkyl, $R^1$ is a radical not having not more than about 8 carbon atoms selected from the group consisting of hydrocarbyl, halohydrocarbyl and cyano lower alkyl, $R^4$ and $R^5$ are each organic radicals of not more than 8 carbon atoms selected from the group consisting of hydrocarbyl, halohydrocarbyl and cyano lower alkyl, $m$ has a value of 0 to 3 and an average value based upon the total amount of silane in the composition of 0 to 1.99, and $p$ has a value of 2 to 46.

2. The composition of Claim 1 further characterized by at least 50% of the total number of $R^4$ and $R^5$ groups being methyl radicals.

3. The composition of Claim 2 further characterized by the remaining $R^4$ and $R^5$ groups being phenyl radicals.

4. The composition of Claim 1 wherein the titanium chelate catalyst has the formula,

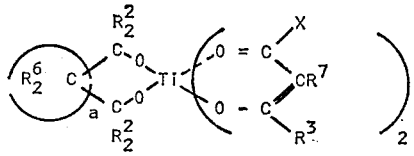

where $R^2$ is a radical selected from the class consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the class consisting of hydrocarbyl, halohydrocarbyl and cyano lower alkyl, $R^6$ is selected from the same class as $R^2$ and halo, cyano, nitro, carboxy ester, acyl and hydrocarbyl substituted by halo, cyano, nitro, carboxy ester and acyl, $R^7$ is selected from the class consisting of hydrogen, hydrocarbyl having not more than about 8 carbon atoms, halohydrocarbyl having not more than about 8 carbon atoms, acyl having not more than about 8 carbon atoms, and taken together with R³ forms together with carbon atoms to which they are attached cyclic hydrocarbon substituents of not more than 12 carbon atoms and chloro, nitro, acyl, cyano and carboxy ester substituted cyclic hydrocarbon substituents; X is a radical having up to 20 carbon atoms selected from the class consisting of hydrocarbyl, halohydrocarbyl, cyanoalkyl, alkoxy, halo-alkoxy, cyanoalkoxy and amino, $a$ is a whole number that varies from 0 to 8 and such that when $a$ is zero the

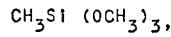

moieties are bonded to each other in a cyclic fashion.

5. The composition of Claim 4 further characterized by R, R¹ and R³ being alkyl radicals and R² and R⁶ being hydrogen.

6. The composition of Claim 4 further characterized by R, R¹ and R³ being methyl radicals, X being —OC₂H₅, and having a value of 1.

7. The composition of Claim 4 further characterized by R² and R⁶ being H.

8. The composition of Claim 4 further characterized by R, R¹, R³ and X being methyl radicals and R² and R⁶ being H.

9. The composition of Claim 4 further characterized by the mixture comprising a base silanol chain-stopped polydiorganosiloxane having a viscosity from about 1,000 to about 90,000 centistokes,

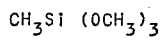

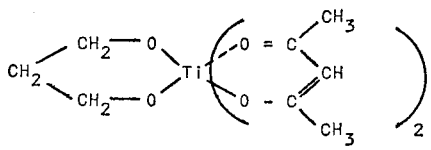

and

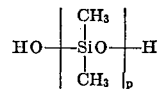

where $p$ is a number that varies from about 3 to 9.

10. The composition of Claim 4 further characterized by the mixture comprising the base silanol chain-stopped polydiorganosiloxane having a viscosity from about 1,000 to about 90,000 centistokes, $$CH_3Si(OCH_3)_3$$

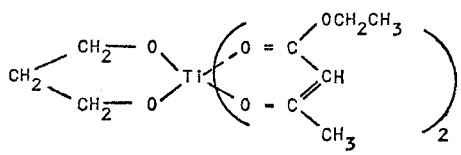

and

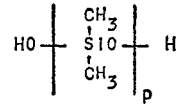

where $p$ is a number that varies from about 3 to about 9.

References Cited
UNITED STATES PATENTS

| | | | |
|---|---|---|---|
| 3,607,972 | 9/1971 | Kiles et al. | 260—46.5 G |
| 3,689,454 | 9/1972 | Smith et al. | 260—46.5 G |
| 3,334,067 | 8/1967 | Weyenberg | 260—46.5 G |

MELVYN I. MARQUIS, Primary Examiner

U.S. Cl. X.R.

117—124 F, 132 BS, 138.8 R; 260—9, 18 S, 32.8 SB, 33.6 SB, 33.8 SB, 46.5 G